US011449874B2

(12) United States Patent
Benkreira et al.

(10) Patent No.: US 11,449,874 B2
(45) Date of Patent: Sep. 20, 2022

(54) METHOD FOR PROVISIONING MERCHANT-SPECIFIC PAYMENT APPARATUS

(71) Applicant: Capital One Services, LLC, McLean, VA (US)

(72) Inventors: Abdelkader M'Hamed Benkreira, Washington, DC (US); Tyler Maiman, Melville, NY (US); Brendan Way, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 211 days.

(21) Appl. No.: 16/880,362

(22) Filed: May 21, 2020

(65) Prior Publication Data

US 2021/0365951 A1   Nov. 25, 2021

(51) Int. Cl.
G06Q 20/40   (2012.01)
G06Q 20/34   (2012.01)

(52) U.S. Cl.
CPC ....... *G06Q 20/4097* (2013.01); *G06Q 20/341* (2013.01); *G06Q 20/352* (2013.01); *G06Q 20/4012* (2013.01); *G06Q 20/40145* (2013.01)

(58) Field of Classification Search
CPC . G06Q 20/4097; G06Q 20/341; G06Q 20/352
USPC .......................................................... 705/75
See application file for complete search history.

(56) References Cited

U.S. PATENT DOCUMENTS

| 10,546,108 B1 * | 1/2020 | Eidam | H04W 12/33 |
| 2015/0186872 A1 * | 7/2015 | Sobol | G06Q 20/351 |
| | | | 705/41 |

* cited by examiner

*Primary Examiner* — Allyson N Trail
(74) *Attorney, Agent, or Firm* — KDB

(57) ABSTRACT

Various embodiments are directed to a method and system for provisioning a merchant-specific payment apparatus, such as a temporary payment card, via a computing device, such as an automated teller machine (ATM). A user, such as a customer, may specify a merchant. A record of known payment acceptance types at that merchant may be returned, which may be used to determine what type of temporary payment card gets issued to the user.

17 Claims, 8 Drawing Sheets

100

PRIOR TRANSACTIONS 402

ABC BOOK STORE AND CAFE
1234 MAIN ST.
CITY, STATE 54321

*TRANSACTIONS FROM 01/01/2020 TO 02/01/2020:*

01/01/2020 | CUSTOMER 1 | $31.52 | MAG STRIPE
01/01/2020 | CUSTOMER 2 | $14.22 | NFC CHIP
01/04/2020 | CUSTOMER 1 | $7.54  | NFC CONTACTLESS
01/05/2020 | CUSTOMER 3 | $5.56  | NFC CHIP
01/08/2020 | CUSTOMER 4 | $25.33 | NFC CHIP
01/08/2020 | CUSTOMER 2 | $38.67 | NFC CHIP
01/11/2020 | CUSTOMER 5 | $55.26 | NFC CHIP
01/12/2020 | CUSTOMER 1 | $4.69  | MAG STRIPE
01/13/2020 | CUSTOMER 3 | $60.08 | MAG STRIPE
01/15/2020 | CUSTOMER 3 | $85.46 | NFC CHIP
01/18/2020 | CUSTOMER 4 | $8.96  | NFC CONTACTLESS
01/21/2020 | CUSTOMER 5 | $12.12 | NFC CHIP
01/22/2020 | CUSTOMER 2 | $15.26 | NFC CONTACTLESS
01/24/2020 | CUSTOMER 2 | $19.08 | MAG STRIPE
01/26/2020 | CUSTOMER 4 | $14.36 | NFC CHIP
01/28/2020 | CUSTOMER 1 | $7.76  | NFC CONTACTLESS
01/28/2020 | CUSTOMER 5 | $35.76 | NFC CHIP
01/29/2020 | CUSTOMER 4 | $85.76 | NFC CHIP
01/31/2020 | CUSTOMER 4 | $17.17 | NFC CONTACTLESS
02/01/2020 | CUSTOMER 1 | $11.36 | MAG STRIPE

400
FIG. 4

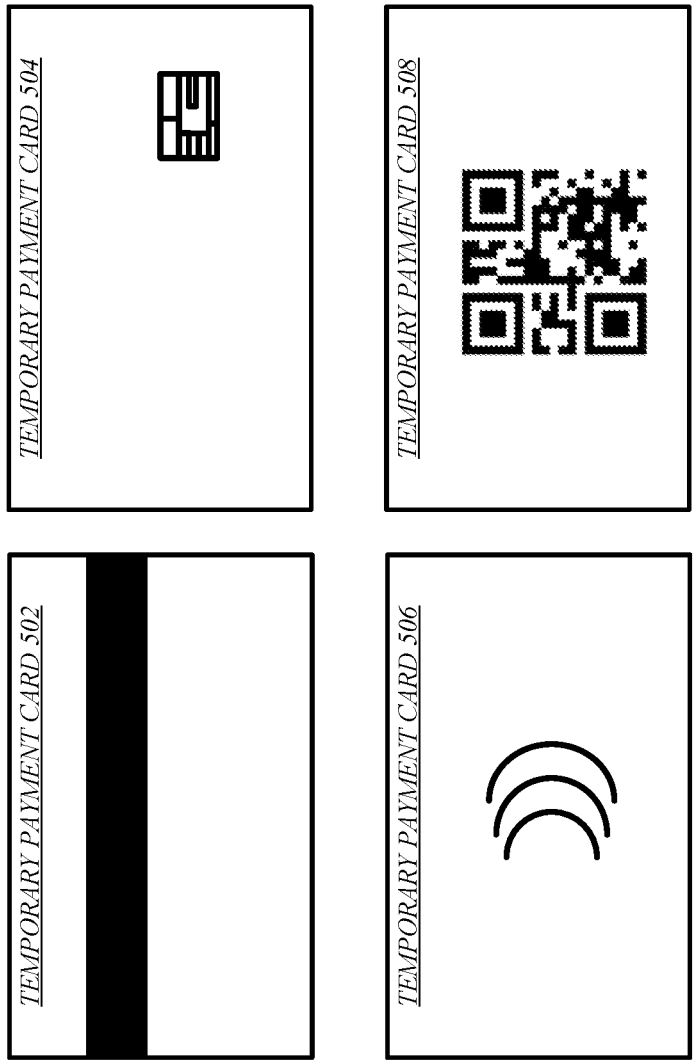

600

```
┌─────────────────────────────────────────────┐
│ AUTHENTICATE A USER AND, BASED ON THE       │
│ AUTHENTICATION, GRANT THE USER              │
│ ACCESS TO AN INTERFACE                      │
│ 602                                         │
└─────────────────────────────────────────────┘
                       │
┌─────────────────────────────────────────────┐
│ RECEIVE A REQUEST FOR A TEMPORARY PAYMENT CARD │
│ FOR USE AT A MERCHANT                       │
│ 604                                         │
└─────────────────────────────────────────────┘
                       │
┌─────────────────────────────────────────────┐
│ DETERMINE PAYMENT ACCEPTANCE INFORMATION    │
│ ASSOCIATED WITH THE MERCHANT                │
│ 606                                         │
└─────────────────────────────────────────────┘
                       │
┌─────────────────────────────────────────────┐
│ DETERMINE A TYPE OF THE TEMPORARY PAYMENT CARD │
│ BASED ON THE PAYMENT ACCEPTANCE INFORMATION │
│ 608                                         │
└─────────────────────────────────────────────┘
                       │
┌─────────────────────────────────────────────┐
│ ISSUE THE TEMPORARY PAYMENT CARD BASED ON THE │
│ DETERMINED TYPE                             │
│ 610                                         │
└─────────────────────────────────────────────┘
```

*FIG. 6*

METHOD FOR PROVISIONING MERCHANT-SPECIFIC PAYMENT APPARATUS

BACKGROUND

Typically, a temporary payment device is provisioned by a specific merchant and designed to work only on that merchant's payment-acceptance systems. For example, temporary fare payment devices associated with a transit system, such as magnetic stripe cards, may be purchased only through authorized card vending machines and may be accepted by fare payment-acceptance systems provisioned by the transit system, such as swipe-enabled gate mechanisms located at the entrance of an underground rail system of the transit system. Other types of temporary payment devices are similarly limited. For example, not all merchants accept temporary debit or credit gift cards that can be purchased at a store or online.

SUMMARY

Various embodiments are generally directed to a method and system for provisioning a merchant-specific payment apparatus, such as a temporary payment card, via a computing device, such as an automated teller machine (ATM). A user, such as a customer, may specify a merchant. A record of known payment acceptance types at that merchant may be returned, which may be used to determine what type of temporary payment card gets issued to the user.

BRIEF DESCRIPTION OF THE DRAWINGS

FIG. 4 illustrates an example merchant lookup and transaction record analysis in accordance with one or more embodiments.

FIG. 5 illustrate example merchant-specific temporary payment cards issued by an ATM in accordance with one or more embodiments.

FIG. 6 illustrates an example flow diagram in accordance with one or more embodiments.

DETAILED DESCRIPTION

Figure 1:
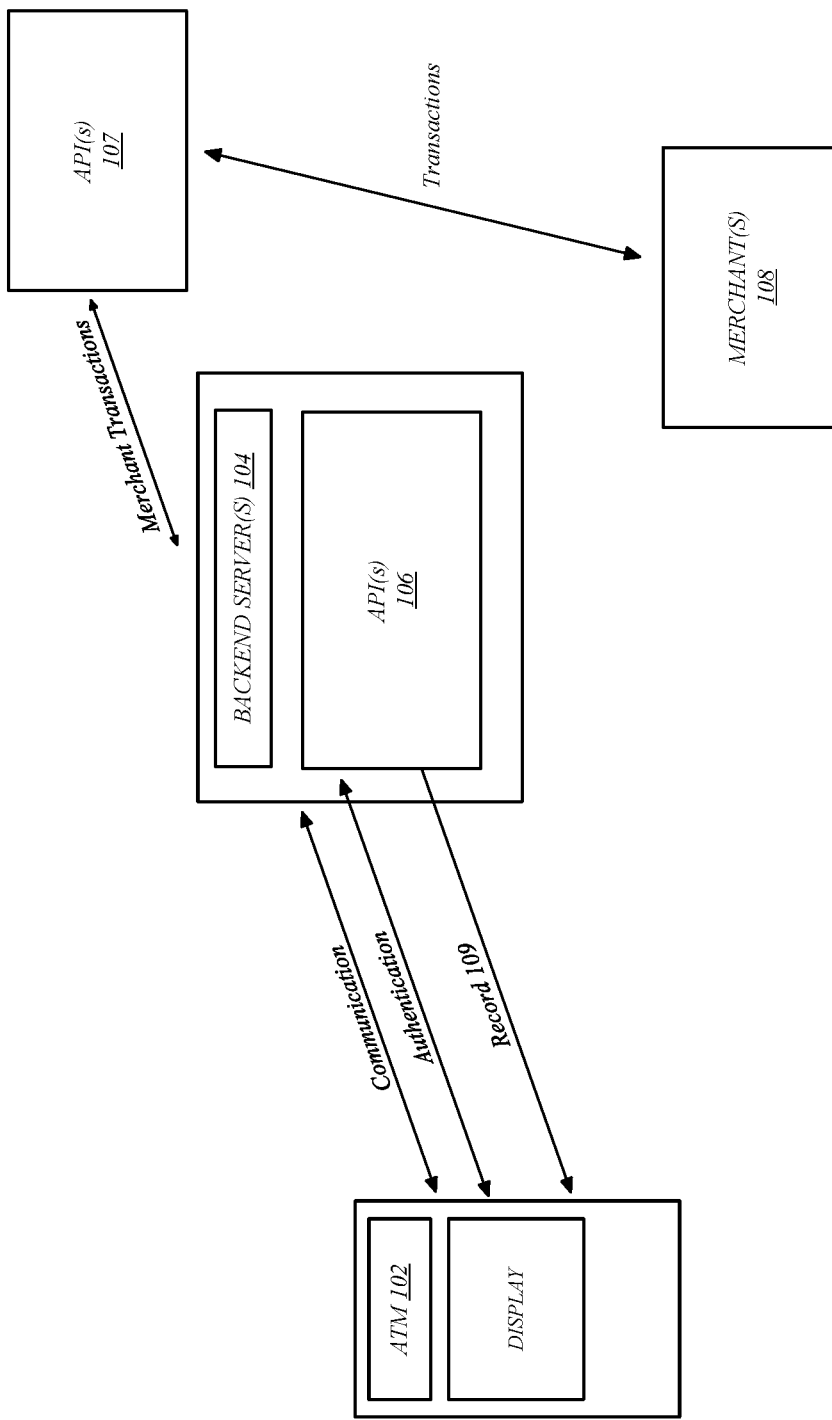
FIG. 1 illustrates an example merchant-specific payment apparatus provisioning system in accordance with one or more embodiments.

Various embodiments are generally directed to a method and system for provisioning a merchant-specific payment apparatus, such as a temporary payment card, via a computing device, such as an automated teller machine (ATM) or any other suitable standalone machine (e.g., electronic kiosk).

In examples, an ATM may authenticate a user (e.g. customer), and via an ATM interface, present the user at least an option to obtain a temporary payment card. The user may input, specify, or select at least one merchant, via the ATM interface, where the user desires to use the temporary payment card, which may then cause the ATM to communicate with one or more application programming interfaces (APIs). For example, the APIs may be merchant lookup APIs supported or executed by one or more backend server computers.

In further examples, the merchant lookup performed by the APIs (or other backend system components) may return a record of known payment acceptance types for the specified merchant. For instance, the known payment acceptance types may include magnetic stripe, NFC-chip, NFC-contactless, quick response (QR) code payment, virtual card number, virtual wallet, etc. In embodiments, the merchant lookup process may involve a query and analyze prior transaction records at the specified merchant across numerous (e.g., all) customer accounts to determine the types of payment accepted at that merchant.

The returned record of known payment acceptance types at the specified merchant may be used to determine what payment types or payment mechanisms are to be included in the temporary payment card. For example, if the merchant accepts only NFC-chip payment, the temporary payment card may include an NFC chip and nothing else. In at least that regard, the need to add multiple redundant or frivolous payment mechanisms to a single card can be avoided. The temporary payment card may then be issued to the user by the ATM.

In additional examples, the temporary card payment may include payment mechanisms accepted by more than one specified merchant. Thus, if the user specifies two different merchants, payment mechanisms associated with the payment types accepted at the two merchants may be included in the temporary card. Moreover, the temporary payment card issued by the ATM may be limited or bound to the specified merchant(s) and may not be used at another merchant.

In prior solutions, as described above, temporary payment cards were designed and issued by the merchant to operate only on the merchant's payment systems. Moreover, the payment mechanisms on the in-store debit or credit cards were very limited in variety and functionality. The embodiments and examples described herein overcome the above problems and are advantageous over the previous solutions in that the specific payment types accepted at a specified merchant can be determined and the payment mechanisms supporting the determined payment types may be integrated into the temporary payment card. Accordingly, a merchant-specific payment apparatus may be provisioned in a cost-effective and resourceful manner. Moreover, the merchant-specific payment apparatus has many advantageous uses. For example, if a user accidently leaves the user's payment instrument at home or misplaces it, the merchant-specific payment apparatus can still be provisioned at an ATM, unlike a store-bought debit or credit gift card that requires to be purchased by the user.

Reference is now made to the drawings, where like reference numerals are used to refer to like elements. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates an example merchant-specific payment apparatus provisioning system 100 according to one or more embodiments. As will be further discussed below, one or more computing devices (e.g., ATMs, server computers, laptops, smartphones, tablet computers, point-of-sale devices, etc.), and/or processing circuitries thereof, may be operable, individually or together, to execute instructions that execute, run, and/or provide support to the system 100, the various components therein, and all of its features.

As shown, the merchant-specific payment apparatus provisioning system 100 may include at least an ATM 102 and one or more backend server computing devices 104 for supporting or executing one or more application programming interfaces (APIs) 106. As will be further described below, the one or more APIs 106 may be configured as merchant lookup APIs. As further shown, the merchant lookup APIs may be able to communicate with other APIs 107 (e.g., internal backend APIs) having access to merchant transactions across customer accounts, or in some examples, may communicate directly or indirectly with the merchant(s) 108. In other examples, the merchant(s) 108 may communicate directly with backend server computing device 104.

In embodiments, a user (e.g., customer) may approach the ATM 102 and request a merchant-specific payment apparatus, e.g., a temporary payment card. The payment apparatus may be requested by the user for various reasons, e.g., user lost card and waiting on new card in the mail, user left wallet at home, user misplaced card, user is gifting temporary payment card, etc. Before the user can request the temporary payment card, the ATM 102 may authenticate the user.

One example authentication may involve the user conventionally inserting an existing customer card in the ATM 102 and entering a personal identification number (PIN). Another example authentication may involve multifactor authentication (e.g., entering password and calling the user on the user's mobile device, entering password and texting the user a one-time code to the user's mobile device). As will be further described below, yet another example authentication may involve biometric authentication (e.g., recognizing biometric identifiers or unique physiological characteristics of the user) via a camera of the ATM 102 or other types of interfaces. One of the numerous advantages of authenticating the user via multifactor or biometric authentication is that the user does not need to physically possess a card or any card for that matter to authenticate the user and to ultimately obtain the temporary payment card, which is advantageous in situations where the user's card is forgotten, lost, or misplaced.

Upon successfully authenticating the user, the user may select an option on an ATM interface 103 to obtain the temporary payment card. In response, the user may specify a specific merchant (and in some cases, more than one merchant). The merchant can be selected from a list of nearby merchants or the user may manually input a name of the merchant. In some examples, the ATM 102 may be GPS-enabled and may be configured to determine and identify all nearby merchants within a predefined distance.

As illustrated in FIG. 1 by the double-headed arrow, the ATM 102 may communicate with or connect to the one or more backend server computing devices 104. In examples, the one or more backend server computing devices 104 may be configured to at least match the user input or user selection to a specific merchant. As will be further described in detail below, if it is determined that the user input or selection corresponds to a legitimate or locatable merchant, then the merchant lookup API(s) may return a record 109 of known payment types accepted by the specified merchant. If the user input or selection does not correspond to a legitimate or locatable merchant, then a generic temporary payment card may be issued.

If the merchant is legitimate or locatable, the merchant lookup APIs and/or other backend components of the system 100 (not shown) may query and analyze prior transaction records or data at that merchant across numerous customer accounts, e.g., all customer accounts. In some examples, the prior transaction records may span a predefined period of time, e.g., a more recent time period such as from six months prior to present. Based at least in part on the analysis of the prior transaction records, one or more payment types accepted at the merchant can be known. For examples, metadata, transaction description, identifiers, etc. may reveal that the merchant accepts (or does not accept) magnetic stripe payment, NFC-chip payment, NFC-contactless payment, RFID contactless payment, quick response (QR) code payment, virtual card number payment, virtual wallet payment, and/or any other suitable contact or contactless payment types.

According to examples, the ATM 102 may receive the record 109 of the known payment types accepted by the specified merchant. Using the record 109, the ATM 102 may determine what type of physical temporary payment card will be issued to the user. The type of the temporary payment card may be determined by or based on what payment mechanisms (or payment capabilities) are included or set up therein. For instance, if the merchant accepts either magnetic stripe payment and/or NFC-chip payment, the ATM 102 may determine to issue a payment card that only includes an NFC chip for conducting NFC-chip based payments. No other payment mechanisms, hardware, or payment means may be included in the card. In examples, the determination of which payment mechanisms to include and exclude may be based on cost, transactional security, complexity involved in creating the card, protection of personally identifiable information (PII), etc. In some examples, the payment mechanisms may be chosen by the user. In at least this regard, the need to add multiple redundant payment mechanisms into the same temporary payment card can be advantageously eliminated.

The ATM 102 may then issue a merchant-specific temporary payment card to the user having only the NFC chip. In some examples, the ATM 102 may restrict the card to the specified merchant and cannot be used at different merchants. Moreover, the card may be restricted to a time period, a specific value or amount, and/or a particular geolocation or vicinity at or around the location. Although the ATM 102 is configured to issue a physical card to the user as the merchant-specific payment apparatus in the examples and embodiment described herein, it may be understood that, in some examples, a virtual merchant-specific payment method be provisioned by the ATM 102, e.g., a virtual payment card or virtual card number can be transferred to the user's mobile device and can be used at the specified merchant.

As described above, if the user does not specify an existing, legitimate, or locatable merchant, a generic temporary payment card may be issued by the ATM 102. The generic card may include at least one form of payment via a respective payment mechanism or capability that is most common among stores within a predefined geographic boundary around the ATM 102. For example, if magnetic stripe and NFC-chip are the most common forms of payment, then the generic card may include only a magnetic stripe and an NFC chip. It may be understood that the determination of what payment types are most common (or uncommon) in the geographic area may be based on an analysis of transaction records or data from a plurality of merchants within the geographic area.

Figure 2:
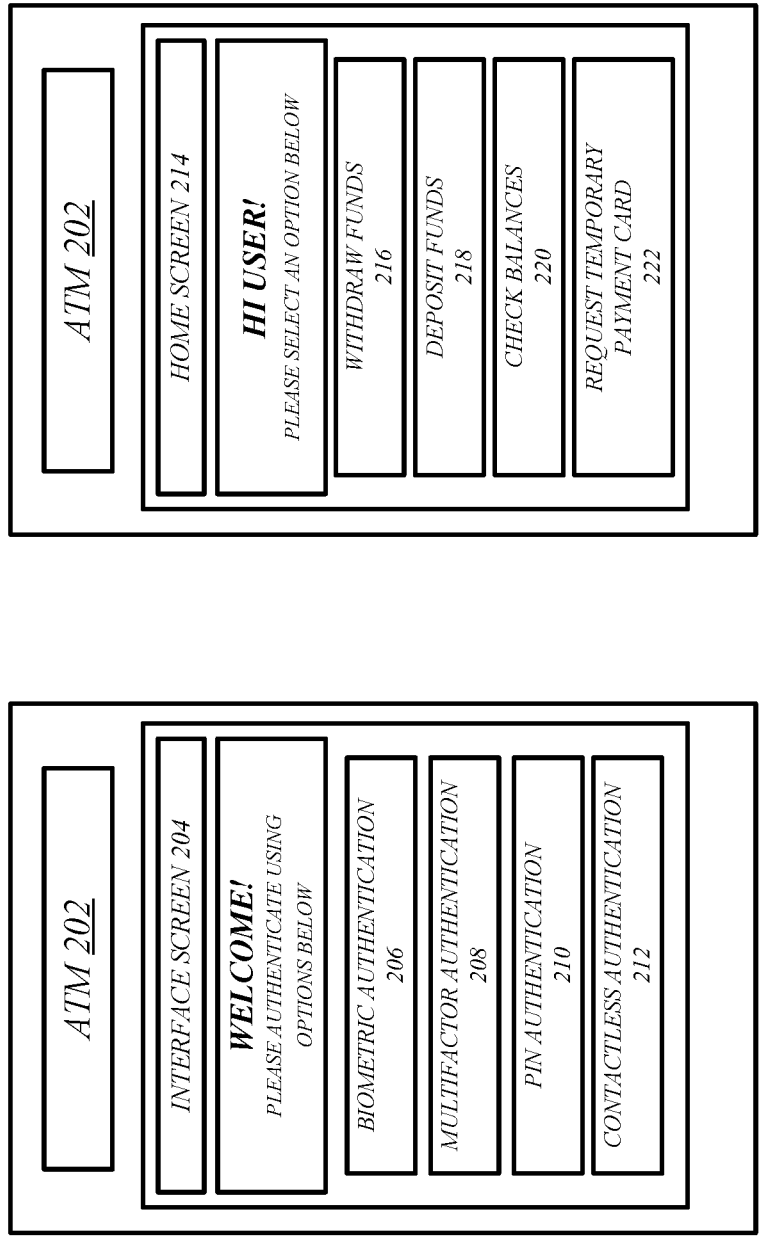
FIG. 2 illustrates an example user authentication at an ATM in accordance with one or more embodiments.

FIG. 2 illustrates an example user authentication 200 at an ATM 202 and ATM access according to one or more embodiments. The ATM 202 may be similar or identical to the above-described ATM 102. When a user approaches the ATM 202, the user may see interface screen 204. As shown, the interface screen 204 may display a greeting or welcome statement and at least four icons 206, 208, 210, 212 below the greeting for performing user authentication. In examples, the user may select icon 206 for biometric authentication, icon 208 for multifactor authentication, icon 210 for personal identification number (PIN) authentication, and icon 212 for contactless card authentication.

In examples, biometric authentication via icon 206 and multifactor authentication via icon 208 may provide the user ways to access services of the ATM 202 without requiring the user to physically have a card (e.g., customer credit card, debit card, charge card, etc.) on the user. As described above, in some instance, the user may have left the user's wallet at home or misplaced or lost the card.

According to embodiments, the biometric authentication may involve the ATM 202 receiving, via input device(s), one or more unique biometric identifiers, which may be distinctive and measurable physiological characteristics used to label or describe individuals. For example, physiological characteristics include, but are not limited to, a fingerprint, palm veins, face recognition, palm print, hand geometry, iris recognition, DNA-based recognition, and/or voice recognition.

The input devices used to receive the one or more unique user biometric identifiers may include a fingerprint reader, palm reader, camera, microphone, eye scanner, etc. Thus, in examples, the user may provide the ATM 202 one or more biometric inputs (e.g., fingerprint, eye scan) via the one or more input devices, which may be matched against biometric information stored on backend side of the system. For instance, the user may have already provided various biometric identifiers, e.g., when applying for a customer card at a specific branch location, and the biometric identifiers may be encrypted and stored in backend database(s). The ATM 202 may communicate with one or more API endpoints (e.g., authentication APIs) to determine whether the biometric inputs received at the ATM 202 match any backend biometric information and whether the match corresponds to the user.

According to further embodiments, the multifactor authentication may involve the user providing the ATM 202 two or more pieces of evidence (or factors), such as knowledge (e.g., something the user and only the user knows), possession (e.g., something the user and only the user has), inherence (e.g., something the user and only the user is), etc. An example of multifactor authentication is two-factor authentication. In examples, two-factor authentication may involve the user entering an ATM password string (something the user knows) and pressing a button the user's mobile device in response to receiving a call (something the user has), or entering the ATM password string and responding to a text message received on the user's mobile device (something the user has). In either of these two-factor authentication examples, the user is not required to physically possess a customer card to perform authentication.

Another example of two-factor authentication is the PIN authentication via icon 210, which involves a correct combination of a specific customer card (something the user possesses) and a PIN (something the user knows) associated with that customer card. According to yet a further embodiment, contactless card authentication may involve the user tapping the user's contactless customer card to an NFC reader of the ATM 202. The ATM 202 may receive an authentication payload from the contactless card (e.g., cryptogram containing an encrypted customer identifier) and send the payload to the one or more backend authentication APIs to determine whether the contactless card actually belongs to the user based on matching the decrypted customer identifier from the payload to backend customer identification information.

The PIN and contactless card authentication examples involve situations involving the user still physically possessing a customer card. Thus, the provisioning of a temporary payment card by the ATM 202 is not limited only to instances or situations involving the user not physically possessing a customer card. In some examples, the user may request a temporary payment card for gifting purposes (e.g., as an amount and merchant restricted gift card).

Upon successful authentication of the user, the ATM 202 displays a home screen 214. As shown, the home screen 214 may present various ATM-related actions (via icons) that can be selected and performed, such as withdrawing funds 216, depositing funds 218, checking balances 220, updating or changing personal information 222, and requesting a temporary payment card 224 (which will be further described in detail below).

Figure 3:
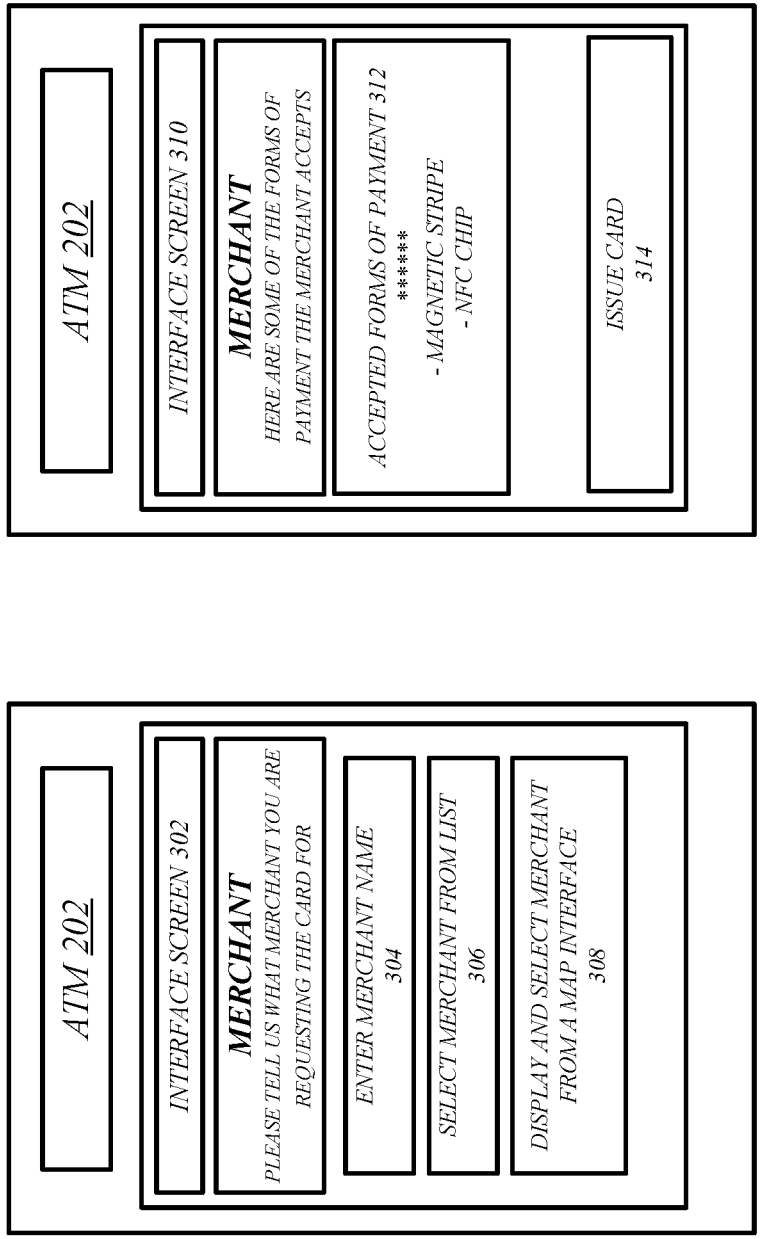
FIG. 3 illustrates an example merchant specification at an ATM in accordance with one or more embodiments.

FIG. 3 illustrates an example merchant specification process 300 at ATM 202 according to one or more embodiments. When the user is successfully authenticated and gains access to the ATM services, the user may select icon 224 to request a temporary payment card. Upon selecting icon 224, the ATM 202 may display various selectable options to the user for specifying the merchant where or at which the temporary payment card will be used.

As shown, interface screen 302 may display at least icon 304 for entering a name of the merchant, icon 306 for selecting a specific merchant from a list of merchants, and icon 308 for displaying merchants on a map interface. When icon 304 is selected, the user may use a digital or physical keyboard to type in the name of the merchant in a textbox. In examples, the ATM 202 may autofill the textbox with possible merchant names as the user is typing based on existing merchants within a predefined geographic vicinity (e.g., 1 mile, 5 miles, 10 miles, 25 miles) of the ATM 202. If the merchant input or otherwise specified in the textbox is not an "autofill merchant," the backend system (e.g., backend server computers and/or associated APIs) that the ATM 202 is connected to may match the user's input a specific merchant, which may include at least determining whether the input corresponds to an existing, legitimate, operating, and/or locatable merchant. In some examples, the matching process may be limited to merchants that are geofenced or otherwise geographically within the location of the ATM 202. If the specified merchant by the user exists outside the geofence, the user may be instructed to locate an ATM closer to that merchant (e.g., directions to which may be displayed on ATM 202).

When icon 306 is selected by the user, a list of merchants may be displayed. The list may include a predetermined number of merchants within the aforementioned predefined geographic vicinity from the ATM 202. If the list does not include the merchant the user is looking for, the user may opt to manually input or specify the merchant, e.g., by pressing a back icon to get to icon 304. In further examples, when icon 308 is selected, various merchants around a predefined geographical area may be displayed on a map interface. The user may zoom in and out of the map interface to find and select a particular merchant.

Upon specifying a merchant (or in some examples, multiple merchants) and based on the determination by the backend system that the specified merchant(s) exists and is legitimate, operating, and/or locatable, interface screen 310 may display one or more accepted forms of payment 312 (e.g., magnetic stripe and NFC-chip) and an icon 314 for requesting that the temporary payment card be issued. In examples involving the selection of multiple merchants, a limit on the number of merchants that can be specified may be placed, such as a maximum of three merchants.

FIG. 4 illustrates an example merchant lookup and transaction record analysis 400 according to one or more embodiments. As described above, once a merchant has been specified and is matched to a specific merchant, one or more merchant lookup APIs via the backend server computing devices may send an ATM a record of known payment acceptance types for that particular merchant, processed, and displayed to the user (e.g., the displayed one or more accepted forms of payment 312 of FIG. 3). The types of payment accepted at the merchant may be analyzed to determine which payment mechanisms, functionalities, or capabilities associated with the accepted payment types to include in the temporary payment card, which will be further described in detail below.

The backend system communicating with the ATM may return the record of known payment types at the merchant by at least querying and analyzing prior transaction 402 records or data associated with the specified merchant across numerous customer accounts. In examples, the query window can be a predefined time period, e.g., from six months prior to present.

As shown, for instance, a total of 20 prior transactions at the merchant may be acquired for five different customer accounts during the past month. For the particular query batch illustrated in FIG. 4, three different known payment types accepted at the merchant can be identified: magnetic stripe, NFC-chip, and NFC contactless. Of the three accepted payment types, an analysis on the query batch may reveal that NFC-chip payment was the most commonly used form of payment (e.g., occurring 10 times compared to the five occurrences of magnetic stripe and five occurrences of NFC contactless).

In at least that regard, not only does the merchant lookup and transaction record analysis 400 for the five different customer accounts during the past month reveal the three different accepted payment types, but also reveals that a payment mechanism (e.g., NFC enabled chip) corresponding to the most common form of payment (e.g., NFC-chip payment) at the merchant may be the best (e.g., most cost-effective, optimal, most efficient, most secure, etc.) payment mechanism to include in the temporary payment card issued to the user by the ATM.

FIG. 5 illustrate example merchant-specific temporary payment cards 500 issued by an ATM according to one or more embodiments. One or more of the merchant-specific temporary cards 500 illustrated in FIG. 5 may be the actual card(s) output to the user from the ATM in response to the user's request for a temporary payment card. While the temporary payment cards 500 may be physical cards, it may be understood that, in some examples, the ATM may also provision or issue a virtual card having a virtual card number (if accepted at the specified merchant).

As shown, the merchant-specific temporary payment cards 500 may include at least a card 502 having only a magnetic stripe as the payment mechanism, a card 504 having only an NFC chip as the payment mechanism, a card 506 having only NFC or RFID hardware (not shown) as the payment mechanism for contactless payment, and a card 508 having a QR code as the payment mechanism. If a generic card were to be issued by the ATM, the card may have any one of the above payment mechanisms based on the most common form of payment type among a plurality of nearby merchants. Moreover, in some examples, if the user selects more than one merchant where the temporary card is to be used, the card may include two or more of the above payment mechanisms supported by the two or more specified merchants.

In embodiments, the payment mechanisms included in the merchant-specific temporary payment cards 500 may be selected based on one or more various factors. For example, from three different accepted payment types (e.g., magnetic stripe, NFC chip, NFC contactless) that the specified merchant accepts, it may be determined which of the payment mechanisms associated with the accepted payment types is the most commonly used at the merchant, most cost effective, most efficient, most secure, the least complex in terms of making the card, most protective of PII, or the like.

In this example, it may be determined that including only the NFC chip as the payment mechanism is the most cost effective, most secure, and most efficient because a temporary card with such payment mechanism may be able to support not only NFC chip payment but may also support NFC contactless payment, both of which are accepted by the merchant. Moreover, NFC-chip-based transactions may generally be more secure than magnetic stripe payments. Advantageously, only selecting the best payment mechanism corresponding to the payment type accepted by the merchant may reduce multiple redundant payment mechanisms on the same temporary payment card, which reduces cost, unnecessary redundancy, and improves the security and protection of overall transaction and personal information. As described above, it may be understood that the use of the issued merchant-specific temporary payment card may be limited to the specified merchant(s), and in further examples, it may be restricted to a predefined amount and timeframe.

FIG. 6 illustrates a flow diagram 600 in accordance with one or more embodiments. The flow diagram 600 is related to the provisioning and issuance of a merchant-specific temporary payment card to a user. The flow diagram 600 may be implemented by a system, for example, the merchant-specific payment apparatus provisioning system 100 of FIG. 1 or individual components thereof, such as an ATM. It may be understood that the features associated with the illustrated blocks may be performed or executed by one or more computing devices and/or processing circuitry contained therein and further may be understood that the blocks are not limited to any specific order and/or may be executed simultaneously or near simultaneously.

At block 602, a user (e.g. customer) may be authenticated (e.g., at an ATM) and, based on the authentication, the user may be granted access to an interface (e.g., ATM interface). In examples, the user may go to ATM and request a merchant-specific payment apparatus (e.g., temporary payment card). Before the payment apparatus can be requested, the user may need to perform a successful authentication. As described above, user authentication methods may include at least biometric authentication, multifactor authentication, PIN-based authentication, and contactless card authentication. Upon successfully authenticating the user, the ATM may grant the user access to its services.

At block 604, a request for a temporary payment card for use at a merchant may be received. The request may be received via a selectable icon on an ATM interface. Moreover, the user may specify the merchant via the ATM interface. In examples, the merchant can be specified by inputting or spelling out the name of the merchant, the user can select the merchant from a list of merchants, or the merchant can be selected from numerous merchants displayed on a map interface. Once the merchant has been specified, the user's input is matched against a specific merchant and the determined whether the merchant is actually an existing, legitimate, locatable merchant. Moreover, in some examples, it may be determined whether the merchant is within a predefined geographical boundary from the ATM. If not, the ATM may identify the user's input as a disqualified merchant.

At block 606, payment acceptance information associated with the merchant may be determined. According to embodiments, the ATM may communicate with one or more backend servers via one or more merchant lookup APIs, which may be configured to query and analyze customer transactions at the merchant across one or more customer accounts. Based at least in part on this analysis, various payment types (e.g., magnetic stripe, NFC chip, NFC contactless, RFID contactless, QR code contactless, etc.) accepted at the merchant can be identified. The merchant lookup API(s) can then return a record of the known payment acceptance types. In examples, the record returned to the ATM may include information on the payment acceptance types in both the affirmative and negative, e.g., merchant accepts magnetic stripe: YES, merchant accepts NFC chip: YES, merchant accepts NFC contactless: NO, merchant accepts RFID contactless: NO, merchant accepts QR code contactless: NO).

At block 608, a type of the temporary payment card may be determined based on the payment acceptance information determined at block 606. In examples, the type of temporary payment card may broadly refer to what payment mechanism or capability should be included in the temporary payment card based on the known payment acceptance types at the merchant. As described above, various factors may be considered in determining which payment mechanism is to be included in the temporary card. If, for instance, NFC chip payment is the most common form of payment at the merchant and given that NFC chip payments are generally secure, including only an NFC chip (and no other payment mechanism) in the temporary card may be the best option. In some examples, the user may be allowed to select a desired payment mechanism. In at least that regard, including only a limited number of payment mechanisms (e.g., one mechanism) in the card and excluding other redundant payment mechanisms is at least cost effective and efficient. In some examples, more than one payment mechanism may be included in the card for other reasons, such as provisioning the temporary card to be usable or operable at multiple different merchants.

At block 610, the temporary payment card may be issued based on the determined type at block 608. Thus, the temporary payment card may be a physical card with only magnetic stripe payment capability, with only chip payment capability, with only NFC payment capability, with only contactless payment capability, etc. In some examples, a virtual payment card including a virtual card number may be issued. Moreover, as described above, one or more restrictions may be placed on the issued temporary card, such as restricting its use at only the specified merchant, a time period restriction, an amount restriction, and/or a geolocation-based restriction.

Figure 7:
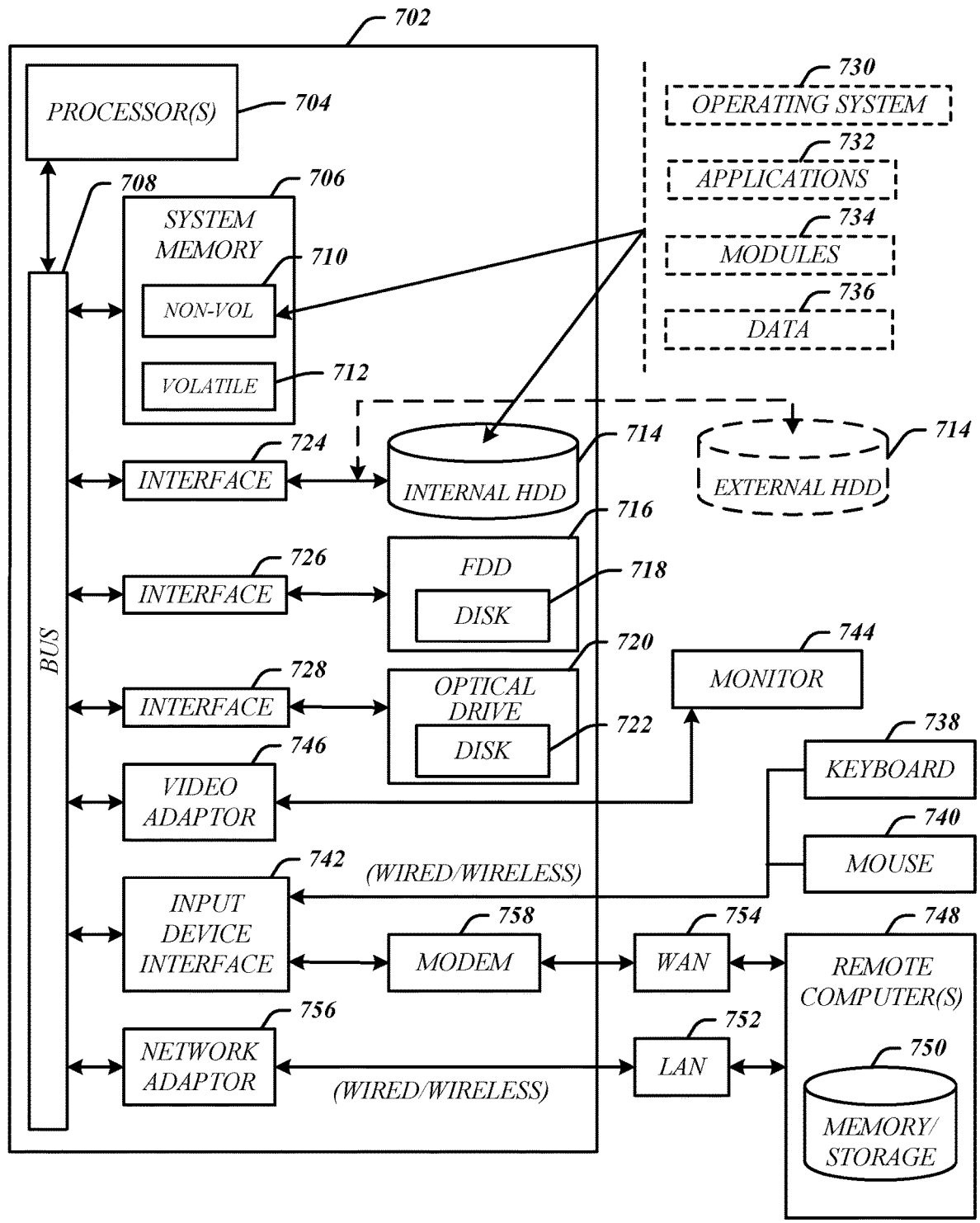
FIG. 7 illustrates an example computing architecture of a computing device in accordance with one or more embodiments.

FIG. 7 illustrates an example computing architecture 700, e.g., of a computing device, such as a desktop computer, laptop, tablet computer, mobile computer, smartphone, etc., suitable for implementing various embodiments as previously described. In one embodiment, the computing architecture 700 may include or be implemented as part of a system, which will be further described below. In examples, the computing device and/or the processing circuitries thereof may be configured to at least execute, support, provide, and/or access the various features and functionalities of the merchant-specific payment apparatus provisioning system 100 of FIG. 1 and/or individual computing components of the system 100, such as the ATM 102 (e.g., the computing architecture 700 may represent the architecture implemented or included in the ATM). In addition to the system, it may be understood that other computing devices or components (e.g., backend server computing devices) and/or the processing circuitries therein may also be configured to implement or include computing architecture 700 and its related functionalities.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes processor 704, a system memory 706 and a system bus 708. The processor 704 can be any of various commercially available processors, processing circuitry, central processing unit (CPU), a dedicated processor, a field-programmable gate array (FPGA), etc.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 800.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 704 through an input device interface 742 that is coupled to the system bus 708 but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754 or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.118 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 8:
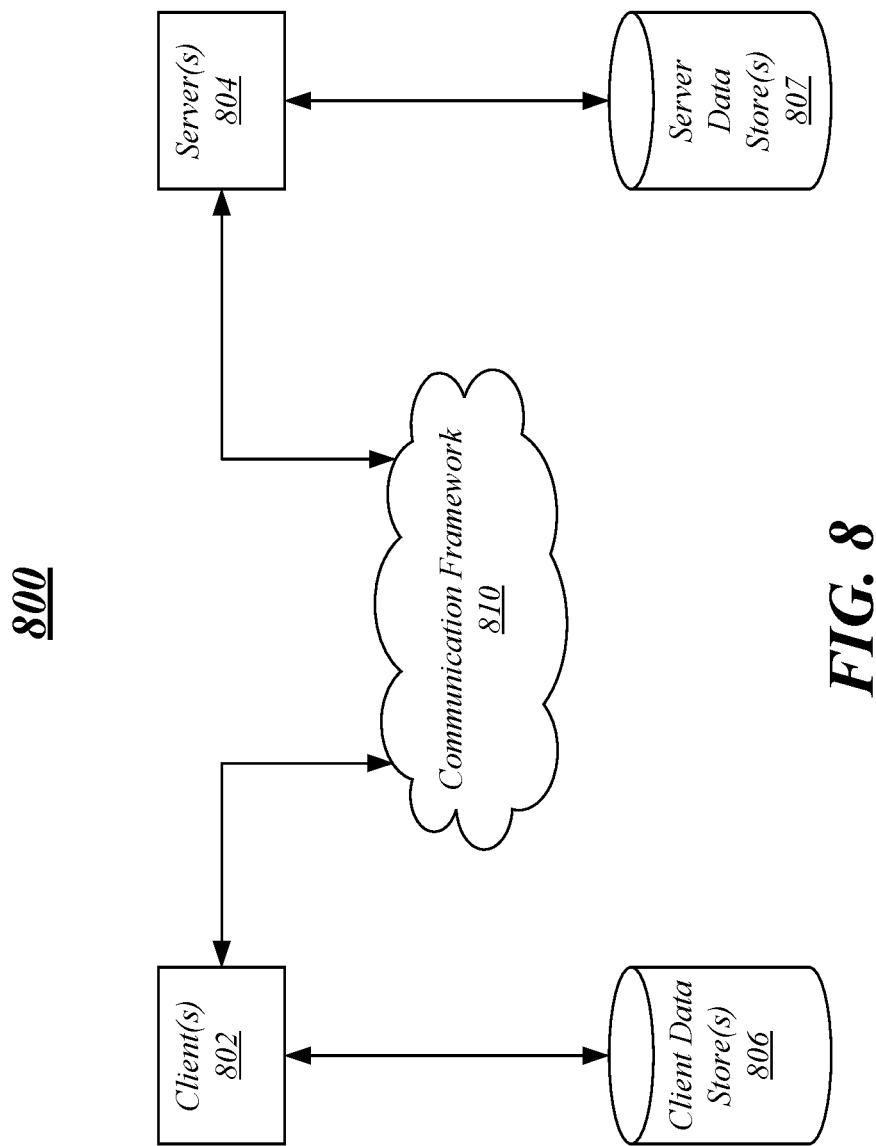
FIG. 8 illustrates an example communications architecture in accordance with one or more embodiments.

FIG. 8 is a block diagram depicting an example communications architecture 800 suitable for implementing various embodiments. For example, one or more computing devices may communicate with each other via a communications framework, such as a network. At least one computing devices connected to the network may be a computing device, such as an ATM. At least a second computing device connected to the network may be one or more server computers, which may be implemented as a back-end server or a cloud-computing server. In some examples, Other devices, such as a user mobile or computing device, may also connect to the communications framework.

The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The one or more clients 802 and the servers 804 are operatively connected to one or more respective client data stores 806 and server data stores 807 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus comprising: memory to store instructions; and one or more processors, coupled with the memory, operable to execute the instructions that, when executed, cause the one or more processors to: authenticate a user; allow, based on the authentication being successful, the user access to an interface; receive, via the interface, a request from the user for a temporary payment card for use at a merchant; determine payment acceptance information associated with the merchant, wherein the processor is to search and analyze prior transaction records corresponding to the merchant across a plurality of user accounts, and identify payment acceptance types based on the analysis of the prior transaction records: determine a type of the temporary payment card to be issued based on the determination of the payment acceptance information; and issue the temporary payment card based on the determined type.

2. The apparatus of claim 1, wherein the determination of the payment acceptance information comprises the one or more processors further caused to: communicate with the merchant; and receive from the merchant a record of the payment acceptance types, and wherein the payment acceptance types includes: (i) magnetic stripe, (ii) chip, (iii) NFC, and/or (iv) contactless.

3. The apparatus of claim 1, wherein the determination of the payment acceptance information comprises the one or more processors further caused to:
communicate with the merchant; and
receive from the merchant the payment acceptance information, and
wherein the payment acceptance information includes: (i) does not accept magnetic stripe payment, (ii) does not accept contactless payment, (iii) does not accept chip, (iv) does not accept NFC payment, (v) only accepts magnetic stripe payment, (vi) only accepts contactless card payment, (vii) only accepts chip payment, and/or (viii) only accepts NFC payment.

4. The apparatus of claim 1, wherein the type of the temporary payment card includes: (i) a physical card with only magnetic stripe payment capability, (ii) a physical card with only chip payment capability, (iii) a physical card with only NFC payment capability, or (iv) a physical card with only contactless payment capability.

5. The apparatus of claim 1, wherein the temporary payment card is a virtual payment card including a virtual card number.

6. The apparatus of claim 1, wherein the one or more processors are further caused to place one or more restrictions on the temporary payment card.

7. The apparatus of claim 6, wherein the one or more restrictions include: (i) a restriction on the temporary payment card to be used only at the merchant, (ii) a time period restriction, (iii) an amount restriction, and/or (iv) a geolocation-based restriction.

8. The apparatus of claim 1, wherein the one or more processors are further caused to:

receive an input from the user an identification or a selection of the merchant;

determine whether the merchant is locatable or identifiable; and provide a generic temporary payment card based on the determination that the merchant is not locatable or not identifiable.

9. The apparatus of claim 1, wherein the authentication of the user includes: (i) personal identification number (PIN) authentication, (ii) biometric authentication, (iii) user contactless card authentication, and/or (iv) multi-factor authentication.

10. A method comprising: authenticating, via one or more processors, a user; receiving a request from the user for a temporary payment card; receiving a selection from the user of a merchant; determining, via the one or more processors, payment acceptance information associated with the merchant comprising searching and analyzing prior transaction records corresponding to the merchant across a plurality of user accounts, and identifying payment acceptance types based on the analysis of the prior transaction records; determining, via the one or more processors, a type of the temporary payment card based on the determining of the payment acceptance information; and issuing the temporary payment card based on the determined type.

11. The method of claim 10, wherein the determining of the payment acceptance information further comprises: communicating with the merchant; and receiving from the merchant a record of the payment acceptance types, and wherein the payment acceptance types includes: (i) magnetic stripe, (ii) chip, (iii) NFC, and/or (iv) contactless.

12. The method of claim 10, wherein the determining of the payment acceptance information further comprises:

communicating with the merchant; and receiving from the merchant the payment acceptance information, and wherein the payment acceptance information includes: (i) does not accept magnetic stripe payment, (ii) does not accept contactless payment, (iii) does not accept chip, (iv) does not accept NFC payment, (v) only accepts magnetic stripe payment, (vi) only accepts contactless card payment, (vii) only accepts chip payment, and/or (viii) only accepts NFC payment.

13. The method of claim 10, wherein the type of the temporary payment card includes: (i) a physical card with only magnetic stripe payment capability, (ii) a physical card with only chip payment capability, (iii) a physical card with only NFC payment capability, or (iv) a physical card with only contactless payment capability.

14. A non-transitory computer-readable storage medium storing computer-readable program code executable by at least one processor to: authenticate a user; allow, based on the authentication being successful, the user access to an interface; receive, via the interface, a request from the user for a temporary payment card; receive, via the interface, a selection from the user of a merchant; determine payment acceptance information associated with the merchant including the at least one processor to search and analyze prior transaction records corresponding to the merchant across a plurality of user accounts, and identify payment acceptance types based on the analysis of the prior transaction records; determine a type of the temporary payment card based on the determination of the payment acceptance information; and issue the temporary payment card based on the determined type.

15. The non-transitory computer-readable storage medium of claim 14, wherein the determination of the payment acceptance information comprises the computer-readable program code further causing the at least one processor to: communicate with the merchant; and receive from the merchant a record of the payment acceptance types, and wherein the payment acceptance types includes: (i) magnetic stripe, (ii) chip, (iii) NFC, and/or (iv) contactless.

16. The non-transitory computer-readable storage medium of claim 14, wherein the determination of the payment acceptance information comprises the computer-readable program code further causing the at least one processor to:

communicate with the merchant; and receive from the merchant the payment acceptance information, and wherein the payment acceptance information includes: (i) does not accept magnetic stripe payment, (ii) does not accept contactless payment, (iii) does not accept chip, (iv) does not accept NFC payment, (v) only accepts magnetic stripe payment, (vi) only accepts contactless card payment, (vii) only accepts chip payment, and/or (viii) only accepts NFC payment.

17. The non-transitory computer-readable storage medium of claim 14, wherein the type of the temporary payment card includes: (i) a physical card with only magnetic stripe payment capability, (ii) a physical card with only chip payment capability, (iii) a physical card with only NFC payment capability, or (iv) a physical card with only contactless payment capability.

* * * * *